3,277,141
NOVEL UREA DERIVATIVES
Gustav Steinbrunn, Schwegenheim, Pfalz, Erich Flickinger, Frankweiler, Pfalz, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Nov. 23, 1964, Ser. No. 413,330
Claims priority, application Germany, Nov. 27, 1963, B 74,425
4 Claims. (Cl. 260—453)

This invention relates to new urea derivatives, especially to derivatives of 1-phenyl-3-isobutyne-(2)-oxyurea. The new compounds have good herbicidal activity. In particular, they have excellent selective herbicidal activity for the control of unwanted vegetation growing among crop plants, without being injurious to the latter.

It is known that urea derivatives of the N-phenyl-N'-methyl-N'-methoxyurea type are used for the control of unwanted vegetation. Their selectivity however is not sufficient.

We have now found that urea derivatives having the formula

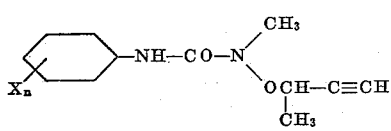

where X denotes hydrogen, chlorine or alkyl and $n$ denotes 1 or 2, $X_1$ and $X_2$ being identical or different, have excellent selective herbicidal activity. Agents containing such urea derivatives are preferably applied after emergence of the crop plants. The said urea derivatives have the added advantage of being easily emulsifiable, which is desirable from the point of view of application technology. Another valuable property of the compounds is their good solubility in oils of different kinds, e.g. waste oils or hydrocarbons. Some of the compounds are sirupy, the others are solid. It is also advantageous that their after-effect in the soil is short.

The said compounds may be prepared from ureas in which the first N bears a p- or m-chlorophenyl, a p-, m- or o-methyl or a p-, m- or o-ethyl radical and the second N bears a hydroxy radical in addition to a methyl radical, by reaction with butyne-(1)-halide-(3). They may also be prepared from α-isobutynylhydroxyl-amines and substituted or unsubstituted phenylisocyanates or substituted phenylcarbamic acid derivatives. The various possibilities of preparation are illustrated by the following reaction formulae:

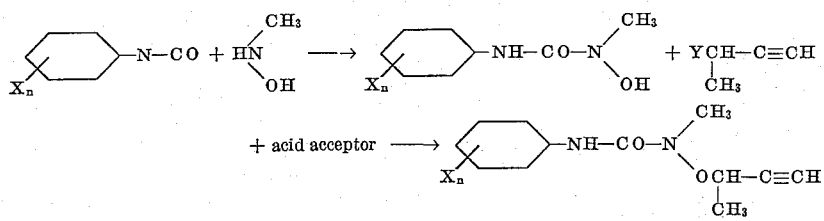

where Y denotes chlorine or bromine
or

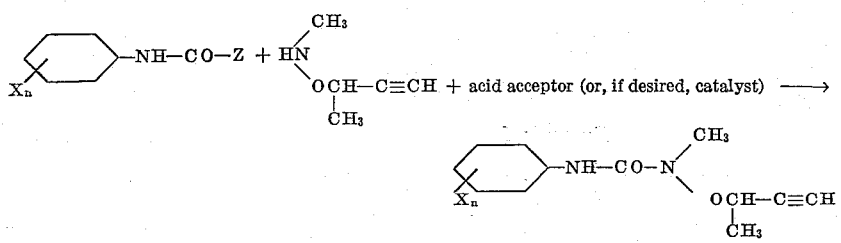

where Z denotes halogen, alkoxy or phenoxy.
X and $n$ have the meanings given above.

Examples of good, active substances are:
N-phenyl-N'-methyl-N'-isobutyne-(2)-oxyurea—sirupy
Analysis.—Found: 12.8% N. Calc.: 12.83% N.
N-3,4-dichlorophenyl-N'-methyl-N'-isobutyne - (2) - oxyurea: melting point, 106 to 107° C.
Analysis.—Found 24.7% Cl. Calc.: 24.75% Cl.

The compounds may be used alone or in admixture with other herbicidal substances, e.g. urea derivatives, s-triazine products, pyridazone derivatives, carbamates, thiocarbamates, uracil derivatives or borates.

The agents according to this invention are prepared by mixing the urea derivatives with conventional carrier materials.

The application of the herbicides according to this invention as compared with prior art herbicides is illustrated by the following examples.

Example 1

In a greenhouse, Indian corn (Zea mays), carrots (Daucus carota), onions (Allium cepa), kidney beans (Phaseolus vulgaris), peas (Pisum sativum), cotton (Gossypium spp.), millet (Panicum sativum), white mustard (Sinapis alba), chamomile (Matricaria chamomilla) and a mixture of weeds consisting of sour dock (Rumex acetosa), chickweed (Stellaria media), tufted vetch (Vicia cracca), amaranth (Amaranthus retroflexus) and ribwort plantain (Plantago lanceolata), having an average height of 7 to 22 cm., were sprayed with N-p-chlorophenyl - N' - methyl - N'-butyne-(1)-oxy-(3)-urea (I) in amounts of 0.75 and 1.5 kg. per hectare of active substance and, for purposes of comparison, with the same amounts of N-3,4-dichlorophenyl-N'-methyl-N'-methoxyurea (II) and N-p-chlorophenyl-N'-methyl-N'-methoxyurea (III), each dispersed, with the addition of sodium lignin sulfonate, in 600 l. of water per hectare. Two weeks after treatment it was found that N-p-chlorophenyl-N'-methyl-N'-butyne-(1)-oxy-(3)-urea had much greater plant compatibility than II and III, particularly with carrots and Indian corn, while having the same effect on the weeds.

In the following table the degree of the damage caused to the plants is indicated in percent:

|  | Active substance | | | | | |
|---|---|---|---|---|---|---|
|  | I | | II | | III | |
| Rate of application, kg./ha. | 0.75 | 1.5 | 0.75 | 1.5 | 0.75 | 1.5 |
| Crop plants: | | | | | | |
| Indian corn | 0 | 0–10 | 60–70 | 70–80 | 35–50 | 50–60 |
| Carrots | 0 | 0 | 30 | 50 | 50 | 75 |
| Onions | 25 | 25 | 100 | 100 | 70 | 90 |
| Kidney beans | 10–20 | 25 | 100 | 100 | 40–60 | 70–80 |
| Peas | 20–30 | 30 | 80 | 80 | 50–60 | 60–80 |
| Cotton | 15–20 | 15–20 | 100 | 100 | 100 | 100 |
| Unwanted plants: | | | | | | |
| Millet | 100 | 100 | 90–100 | 100 | 90 | 90–100 |
| White mustard | 100 | 100 | 80–90 | 80–100 | 90 | 80–100 |
| Chamomile | 90–100 | 90–100 | 80 | 90–90 | 80 | 90 |
| Mixture of weeds | 95 | 95 | 95 | 95 | 95 | 95 |

N - 3,4 - dichlorophenyl-N'-methyl-N'-butyne-(1)-oxy-(3)-urea has an activity similar to that of N-p-chlorophenyl - N' - methyl-N'-butyne-(1)-oxy-(3)-urea. N-3-chloro - 4 - methyl-phenyl-N'-methyl-N'-butyne-(1)-oxy-(3)-urea also has good selective herbicidal activity.

*Example 2*

Plastic pots were filled with clayey sandy soil and sown with Indian corn (Zea mays), barley (Hordeum vulgare), wheat (Triticum sativum), rye (Secale cereale), carrots (Daucus carota), onions (Allium cepa), peas (Pisum sativum), cotton (Gossypium spp.), charlock (Sinapis arvensis), chamomile (Matricaria chamomilla) and small nettle (Urtica urens). The soil was then sprayed with N-p-chlorophenyl-N'-methyl - N' - isobutyne - (2) - oxyurea (I), N-m-chlorophenyl-N'-methyl - N' - isobutyne - (2) - oxyurea (II), N-3,4-dichlorophenyl-N'-methyl-N'-isobutyne - (2) - oxyurea (III), N-phenyl-N'-methyl-N'-isobutyne-(3)-oxyurea (IV), and, for purposes of comparison, with N-p-chlorophenyl-N'-methyl-N'-methoxyurea (V) and
N-3,4-dichlorophenyl-N'-methyl-N'-methoxyurea (IV), in amounts corresponding to 1.5 kg. per hectare, each dispersed, with the addition of sodium lignin sulfonate, in 500 l. of water per hectare.

Four weeks after treatment the herbicidal effect of the substances was determined. The degree of the damage caused to the plants is indicated in the following table (in terms of percentage):

| Active substance | I | II | III | IV | V | VI |
|---|---|---|---|---|---|---|
| Crop plants: | | | | | | |
| Indian corn | 0 | 0 | 0 | 0 | 30–40 | 30 |
| Barley | 0 | 0 | 0 | 5 | 30–40 | 40 |
| Wheat | 0 | 0 | 0 | 0 | 20–30 | 30 |
| Rye | 10 | 0 | 0 | 10 | 30 | 30–40 |
| Carrots | 0 | 0 | 0 | 0–5 | 30 | 10 |
| Onions | 10 | 0–10 | 10 | 15 | 90–100 | 90–100 |
| Peas | 0 | 0 | 10 | 10 | 20–30 | 20–30 |
| Cotton | 0–10 | 0 | 0 | 10 | 30 | 30 |
| Unwanted plants: | | | | | | |
| Charlock | 90–100 | 90–100 | 90–100 | 90–100 | 100 | 100 |
| Chamomile | 90 | 90 | 90 | 90 | 90 | 90 |
| Small nettle | 90–100 | 90–100 | 90–100 | 90–100 | 100 | 100 |

The following substances have similar activity:

N-m-methylphenyl-N'-methyl-N'-isobutyne-(2)-oxyurea,
N-p-methylphenyl-N'-methyl-N'-isobutyne-(2)-oxyurea,
N-3-methyl-4-chlorophenyl-N'-methyl-N'-isobutyne-(2)-oxyurea,
N-3-chloro-4-methylphenyl-N'-methyl-N'-isobutyne-(2)-oxyurea.

In the above compounds the term -isobutyne-(2)-oxyurea is considered the same as the term -sec-but-3-ynyl oxyurea.

We claim:

1. A compound of the formula

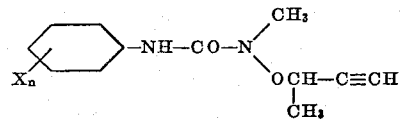

where n denotes one of the integers 1 and 2 and X is a member selected from the group consisting of hydrogen, chlorine and lower alkyl.

2. N-phenyl-N'-methyl-N'-sec-but-3-ynyl oxyurea.

3. N-p-chlorophenyl-N'-methyl-N'-sec-but-3 - ynyl oxyurea.

4. N-3,4-dichlorophenyl-N'-methyl-N'-sec-but-3 - ynyl oxyurea.

References Cited by the Examiner

UNITED STATES PATENTS

| 2,744,819 | 5/1956 | Toorman | 71—2.6 |
| 2,863,754 | 12/1958 | Wain | 71—2.6 |
| 2,960,534 | 11/1960 | Scherer et al. | 260—553 |
| 2,999,110 | 9/1961 | Lott et al. | 260—553 |

ALEX MAZEL, *Primary Examiner.*

JAMES O. THOMAS, JR., HENRY R. JILES,
*Examiners.*

JAMES H. TURNIPSEED, *Assistant Examiner.*

UNITED STATES PATENT OFFICE
CERTIFICATE OF CORRECTION

Patent No. 3,277,141                  October 4, 1966

Gustav Steinbrunn et al.

It is hereby certified that error appears in the above numbered patent requiring correction and that the said Letters Patent should read as corrected below.

Column 3, line 62, for "(IV)" read -- (VI) --.

Signed and sealed this 29th day of August 1967.

(SEAL)
Attest:

ERNEST W. SWIDER
Attesting Officer

EDWARD J. BRENNER
Commissioner of Patents